STRENGTH OF PALLETS 3,814,778
METHOD FOR PRODUCING A COMPOSITE
FOAMED ARTICLE
Kirokuro Hosoda, Yokohama, Naonori Shiina and Yoshio Kadowaki, Tokyo, Makoto Hashimoto, Yokohama, Naohiko Suzuki, Funabashi, and Tadashi Sugita, Sakai, Japan, assignors to The Furukawa Electric Company Limited, Tokyo, and Nissei Kogyo Kabushiki Kaisha, Osaka-fu, Japan
Filed Aug. 26, 1971, Ser. No. 175,206
Int. Cl. B29c 5/04; B29d 27/00; B65d 19/32
U.S. Cl. 264—45
13 Claims

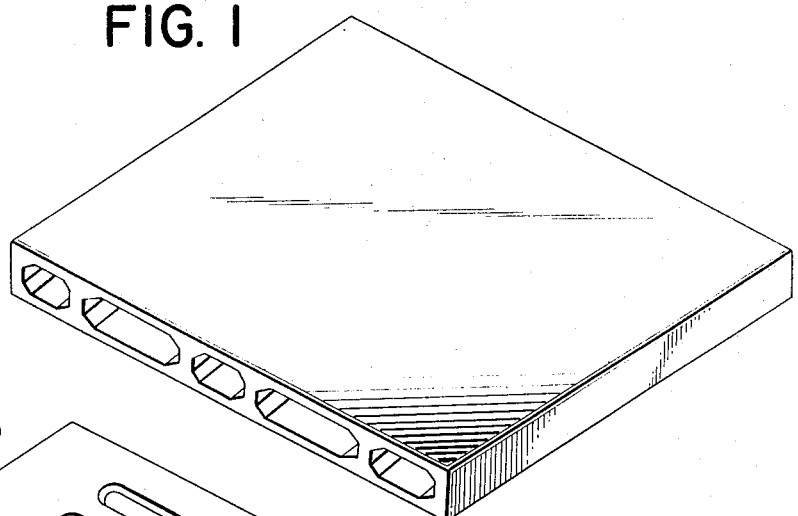
FIG. 1
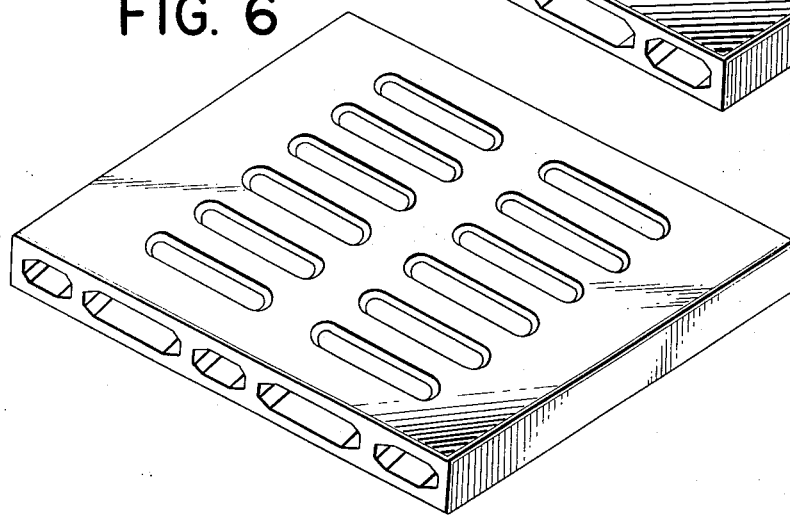
FIG. 6
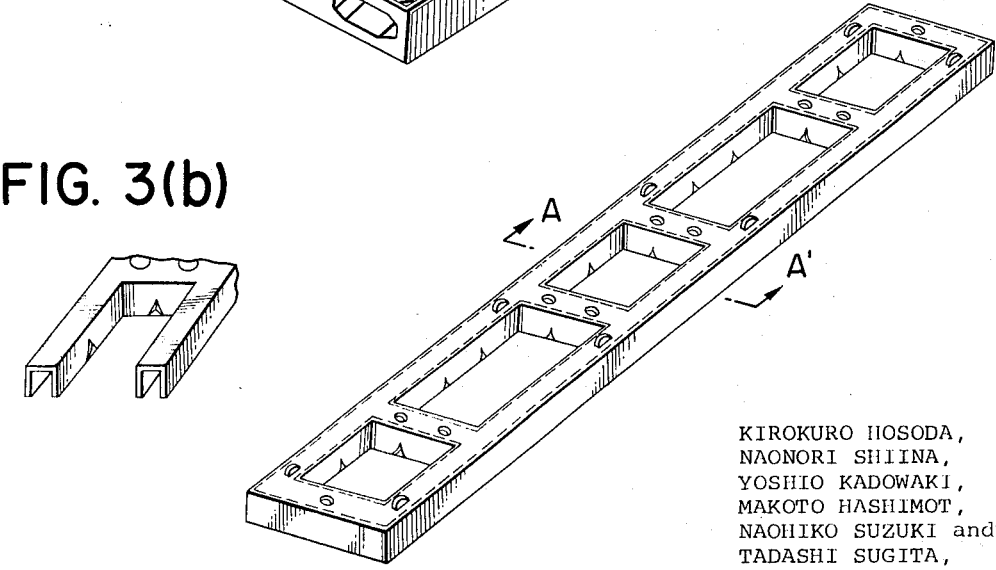
FIG. 3(a)
FIG. 3(b)
KIROKURO HOSODA,
NAONORI SHIINA,
YOSHIO KADOWAKI,
MAKOTO HASHIMOT,
NAOHIKO SUZUKI and
TADASHI SUGITA,
INVENTORS

ABSTRACT OF THE DISCLOSURE

A method for producing foamed composite article which comprises placing powdered plastics and granular plastics containing foaming agent in a mold, rotating or vibrating the mold to separate said two kinds of plastics from each other, and heating and foaming the same while rotation, or vibration of the mold is continued.

Plastic foamed articles have been recently used very widely as building materials, packaging materials and others because they are light in weight and low in cost, in addition to their excellent heat insulating property and shock and sound absorbing characteristics.

However, the shortcoming of plastic foamed articles lies in their low mechanical strength as compared with unfoamed plastic articles. If this shortcoming is overcome, their use will be further expanded. In an attempt to improve and enhance the mechanical properties of foamed plastic articles which are inferior as mentioned above, there is a method to form a thick and strong surface layers on foamed shaped articles, and the foamed shaped articles having such surface layers formed thereon not only are strong but have such features as are peculiar to plastic foamed articles. Thus they are very useful.

As a method of producing such foamed plastic articles having surface layers, as shown in U.S. Pat. 3,455,483 and Japanese Patent Publication No. 46/10,316, a method has been employed in which first an unfoamed surface layer is formed on the inside wall of a mold, then foamable plastic compound is placed in the same and is heated for foaming. While foamed shaped articles having surface layers can be produced by this method, it is necessary in this production method to charge the material twice into a mold and heating is required everytime the material is charged thus involving high cost, and at the same time there is a difficulty in forming a complete bond between the surface layer and inner layer.

As a method of producing plastic shaped articles having surface layers and foamed inner layers by one step of molding, as shown in U.S. Pat. 3,052,927, there is a rotating molding method by centrifugal force, in which such material as polyurethane is used. In this method of foam-molding of polyurethane, etc., as foaming is done while a mold is rotated at a high speed, foaming starts from such portion as is distant from the axis of rotation. The density within molded articles thus obtained differs gradually from one direction to the other. This method also requires a high cost for equipment for high speed rotation, and furthermore has a shortcoming of difficult foaming because visco elasticity of polymers at the time of foaming is very high in a foamable compound of thermoplastic resin.

On the other hand, U.S. Pat. 3,542,912 prescribes a method in which polymers of low melting point and those of high melting point are placed in a mold and are heated while being rotated so that the polymers low melting point form outer layer while those high melting point form inner layer. This method is limited to such polymers as is not compatible to each other, and as the polymers low melting point constitute outer layer, the molded articles obtained are inferior in heat resistance, etc.

The inventors have carefully studied in detail the method for producing foam-molded articles having such composite structure as mentioned above, and found that when powdered plastics and granular plastics containing a foaming agent, which are larger in particle size than said powdered plastics, are placed in a mold and heated while the mold is rotated slowly at such speed as gives no centrifugal force, firstly the powdered plastic material will adhere to the entire inner surface of the mold to form a surface layer, then the granular plastics adhere to the surface layer. Since a comparatively large amount of foaming agent is blended into said granular plastics beforehand, the granular plastics are foamed to fill up the mold, thus producing foamed composite articles with double structure of a strong and thick surface layer and a well foamed inner core.

There must be a difference in particle size between the powder and the granule of thermoplastic resins used in the present invention. In this specification, in order to indicate such difference in particle size, the wording of "powdered plastics" was used for plastics of smaller particle size and "granular plastics" for plastics of larger particle size containing foaming agent. But, this does not mean any absolute difference in shape of plastics used. Instead, it means a relative difference in particle size of plastics.

Therefore, the shape of plastics is not especially a problem. Their shape may be powdery, granular, pellet, cubic, spherical, or any other. Any of these shapes may be selected as long as there is a difference in particle size. The degree of such difference is usually three times and preferably ten times (in diameter in case of spherical shape).

In this method the two kinds of materials charged at one time are easily separated into the surface layer and the well foamed inner core owing to the difference in size of powdered plastics and granular plastics and also to movement of these plastics within the rotating mold. As the separation into the surface layer and inner core is done during the plastics melting process, it has nothing to do with the molten viscosity of the plastics, thus not only thermoplastic resin can be used but certain kinds of thermosetting polymer can be used for the surface layer.

Furthermore in the method of the present invention, for example such additives as flame retardant agent, antioxidant, ultraviolet ray absorbing agent, anti-static agent, powdered or fiber shape reinforcing agent, etc. can be used only in the surface layer, thereby saving the amount of expensive additives used.

Thus, the present invention allows production of composite foamed articles using any plastics having different characteristics, and its application covers a wide field with very high industrial value.

According to the present invention light and strong pallets, etc. can be made which comprise a surface layer of high density polyethylene, polypropylene, ABS resin, nylon, poly-carbonate, etc. and an inner core of cross-linkable polyethylene having good foaming characteristics.

At the same time according to the present invention, a large quantity of hollow glass spheres, light-weight aggregate, etc. can be added beside the powdered plastics and the foamable plastics, then such composite articles can be produced as have a foamed plastics inner core containing hollow glass spheres, or light-weight aggregate, and surface layer. Such composite articles have excellent heat-resistance and are useful as heat-insulating material.

The present invention also makes it possible to obtain molded articles which contain plastic scrap mixed in their inner core and is covered by the surface layer, the plastic scrap being pulverized to a size, almost the same as that of granular plastics.

It is also possible according to the present invention to produce such foamed shaped articles having three or more layers, for example, well foamed innermost layer or core, unfoamed layer, and slightly foamed layer by placing into a mold plastic material with three different plastics sizes, consisting of very fine powdered plastic material which is slightly foamable, granule-shape plastic material which is well foamable and coarse powder of plastic material having such particle size as is intermediate between said fine powdered plastics and and the granular plastics, and by heating the same. It is also possible to secure a very strong bond between surface layer and inner core by suitably selecting the above-mentioned intervening plastic material.

The accompanying drawing illustrates the product produced and its mechanical properties:

FIG. 1 illustrates the foamed pallet produced.

FIGS. 3(a) and 3(b) illustrate metal inserts to strengthen the pallets.

Figure 4:
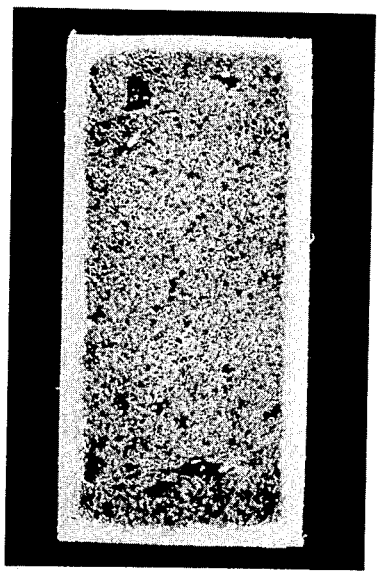

FIG. 4 shows the cross-section of foamed polymeric product having strong surface layer.

Figure 5:

FIG. 5 shows the cross-section of a further modification of the foamed product having a strong surface layer.

FIG. 6 illustrates a further modification of the foamed pallet produced.

The powdered plastics used in the present invention may be any thermoplastic resin, thermosetting resin in such state as is not completely cured and having some melting tendency remaining, or powder of thermoplastic material of cross-linkable nature, or it can be a blended mixture of the same. The cross-linkable plastic material mentioned above can be plastic material having such chemical cross-linking agent added thereto as organic peroxide, azide cross-linking agent, etc., or plastic material cross-linked beforehand by chemical cross-linking agent or by irradiation process, etc. to such an extent as will not impair flowability of plastics.

The powdered plastics used in the present invention needs to be smaller in particle size than granular foamable plastics, thereby said powdered plastics can be melted and made to adhere to inner surface of a mold sooner than the granular plastics while being moved within a mold. But when the powdered plastic are too fine, as the mold is rotated this fine powdered plastics material are apt to coagulate and hard to move within the mold; therefore the fine powdered plastics and the granule plastics are hard to be separated from each other and surface layer with uniform thickness cannot be obtained.

Thus, the particle size of the powdered plastics in the present invention should be determined according to the kind of powdered plastics, structure of mold, and the particle size of granular plastics, and should be ordinarily less than 10 meshes preferably less than 30 meshes. As the powdered plastics must adhere to the inner surface of the mold sooner than the granular plastics, it is desirable that the powdered plastics should be more easily softened than the granular plastics.

But since two kinds of material with different particle sizes are used in the present invention it is not necessarily mandatory to select such powdered plastics as are easier to soften than the granular plastics. For example, by using polypropylene with melting point of 160° C. as powdered plastic material and high-density polyethylene as granular material, satisfactory molded articles for which the present invention is intended can be obtained. As the powdered plastic material can easily be moved and dispersed within a mold, such powdered plastics produced by sedimentation out of solvent are preferred to the powdered plastics mechanically pulverized. In some cases such two kinds of powder, 200 meshes and 30 to 50 meshes are blended to ensure well-balanced movement and easy melting. As another method of enhancing the movement within a mold, powder of non-organic filler or metal with good thermal conductivity and higher density than that of powdered plastics may be added. This kind of powder may be simply blended mechanically by a blender, etc., and such material as calcium carbonate, magnesium sulphate, zinc white, clay, talc, powdered aluminum, etc. are used for this purpose. One of the purposes of the present invention is to obtain strong and light weight foamed plastic shaped articles having strong surface layers. Therefore as the powdered plastics in the present invention such rigid type materials as polypropylene, high density polyethylene, nylon, ABS resin, rigid polyvinyl chloride resin, polycarbonate, phenolic resin, etc. are preferably used. Among these materials, molded articles having surface layers of polyvinyl chloride resin and phenolic resin have flame retardant characteristics, and are therefore useful especially for building materials and transportation gears. And from the standpoint of flame retardance, a large amount of non-organic powder or fiber shape additive is added to surface layer. As the surface layers of the present invention should be strong as generally desired, they are not foamed much, and even when they are foamed, the foaming is held to such an extent that cells retain spherical shape. However, in the case of molded articles for transportation gears it is desirable that they have soft surface, and in some cases a large amount of foaming agent is added to the powdered plastics to form polyhedron cells in surface layer. And in such case, powdered plastic of cross-linkable nature is preferably used, and it is especially desirable to kneed chemical cross-linking agent or foaming agent into plastics by a roll or an extruder and thereafter pulverize the mixture into fine powder. When cross-linkable thermoplastic resin is used as the powdered plastics, the shock resistance of the molded articles will be improved and the amount of materials flowing out of the mold will be reduced, and when a mold having patterned inner surface is used, beautiful pattern can be formed on the surface of the molded articles obtained. The surface layer in the present invention ordinarily has a thickness of 0.5 to 15 mm., while the thickness of 2 to 7 mm. is desirable.

Granular plastics used in the present invention may be of any thermoplastics having flowability when foaming agent decomposes or evaporates, or a mixture of said plastics and of natural or synthetic rubber which is compatible with said plastics may be used. In any case the granular plastics used in the present invention need to have larger particle size than that of powdered plastics. It is ordinarily of 10 mesh or larger and preferably of 5 mesh or larger, and from the standpoint of easiness in separation from powdered plastic during rotary molding within a mold it should preferably of spherical shape or of similar shape but it may be of cube or of rectangular parallelepiped, furthermore it may be of any shape as obtained by simply mechanically pulverizing plastic material. Production can be made in any ratio of powdered material and granule material, but ordinarily the weight ratio of powdered plastics to granular plastics is 2:8 to 9:1. The foamed shaped articles of the present invention should desirably have a well foamed core, and for that purpose cross-linkable plastics is used in many cases. When non-cross-linkable powdered plastic and cross-linkable granule plastics are placed in a mold and are heated, the powdered plastics are melted and form surface layer, then cross-linkable granular plastics crosslink and foam, and as the cells within this material is very stable and the generated gas is hard to escape, sufficiently high inner pressure is generated within the mold, thus producing molded articles having good the outer appearance stable shape and excellent mechanical strength. And the surface layers of said molded articles have very uniform thickness and are well bonded with inner core.

In the present invention hollow glass sphere, light weight aggregate, wood chips, non-foamable plastic material, plastic mixture, etc. are added to the powdered plastic and granular plastics to produce molded articles having a core of foamed material, hollow glass spheres and others. And by suitably selecting these materials, suitable heat-resistance, strength and floatability, etc. can be given. Especially, plastic scrap usually contains wood chips, metal chips, sand, etc., but the molding method of the present invention can produce the molded articles containing said material in their inner core, therefore it is very desirable as a means to utilize such plastic scrap. When slightly foamable plastic, well foamable granular plastics, powdered plastics, and coarse powder which does not foam and has such intermediate particle size as is between those of powdered plastics and granular plastics, are placed together into a mold, and by heating the same while being rotated, foamed shaped articles having such three layers can be produced—the well formed innermost core, non-foamed layer, then slightly foamed layer. As such molded articles have light weight and high strength and shock resistance, they are most suited in many cases as interior material for automobile. And by suitably selecting said intervening plastic, the bonding between surface layer and inner core can be enhanced when the plastics used for surface layers have no compatibility with the plastics for inner core.

The foaming agent in the present invention has a decomposition temperature higher than the softening temperature of plastics, and it may be organic foaming agent or inorganic foaming agent. Sometime volatile foaming agent is used. While the foaming agent used with powdered plastics is usually blended by a blender, etc., the foaming agent mixed in foamable granule plastics is ordinarily mixed in by a roll mill or an extruder, etc.

When cross-linking agent is used, it is necessary to cross-link the plastic to improve their ffowability, i.e. to obtain an appropriate flow ability for foaming then thereafter to expand, therefore the decomposition temperature of the foaming agent used is ordinarily higher than the decomposition temperature of the cross-linking agent. The molded articles in the present invention ordinarily have surface layers expanded one to three times and inner core expanded 5 to 30 times, and as the entire molded articles expanded 2 to 10 times.

The mold used in the present invention is of such type as can be closed, and need not necessarily be very airtight. However in order to secure beautiful external finish while the density of molded articles is low the internal pressure in the mold at the time of foaming is desirably high. Any ordinary cast metal mold can be used, and mold is made by bending steel plates or by welding can also be used. The surface layers of the foamed shaped articles of the present invention are formed as heat is transmitted from outside of a mold by thermal conductance into the mold and powdered plastics are first moltenby heat. Therefore when surface layer of uniform thickness is desired the mold can be uniformly heated. But there is a case in which some portion of the article needs to be made strong and it is necessary to provide a larger thickness for that portion of surface layer; then such portion of the mold as corresponds to above-mentioned portion is made of a metal having good thermal conductance or is made thin. In some cases uneven spots are made an inner surface of the mold so that powder plastics can be gathered at such spots; or metal screen or lath board is provided on inner surface of the mold to reinforce the surface layer portion and at the same time to provide thicker surface layer. In the present invention it is necessary to make the powdered and granular plastics move within a mold before foaming, therefore there must be an unfilled space of 10% or more, preferably in the mold. When rotation is done mono-axially if the unfilled space in the mold exceeds 50% the surface layer is difficult to form at center portion.

While the mold in the present invention is ordinarily heated while being rotated, if said rotation is so fast as to cause a centrifugal force, the separation between the powdered plastic and the granular plastics becomes incomplete. Therefore, suitable range of its rotation speed differs according to the nature, size, specific gravity of the powdered plastics and granular plastics used and to the size of mold. The rotation speed is such that the speed of such portion of mold as moves fastest is ordinarily 15 m./minute or slower, and preferably 5 m./minute to 0.1 m./minute. This rotation may be done-axially, but may be done multi-axially. Generally speaking, it is desirable to make it multi-axial rotation so that plastics can uniformly contact with entire inner surface of the mold for the purpose of making the thickness of surface layer uniform. Although in the production method of the foamed shaped articles according to the present invention, heating and foaming are done while the mold is rotated, this is not the only way. Vibration or impact may be given to the mold in combination with rotation or independently to separate the powdered plastics and granular plastics. When vibration or impact only is used, molded articles are made which are well foamed on one side and not foamed on the other side, and such molded articles are used as back supports of chairs in transportation gears. The heating in the present invention is ordinarily done by hot air or steam, etc. When steam is used it is possible to make the heating temperature low and heating time short; thus steam heating is desirable. The steam heating is also effective in preventing deterioration of plastics or mold. For the separation of powdered plastics and granular plastics within a mold, it is necessary to increase the temperature of mold without heating plastics so that powdered plastics adhere to the innersurface of the mold; therefore generally rapid heating of the mold is desirable. When a mold for making pipe shaped plastic molded articles is heated in an ordinary manner by hot air, thick surface layer is formed on the outside of the pipe, but is difficult to form on the inner surface of the pipe: Therefore, for example a bugle type metal fitting is attached to both ends of the mold to send a greater amount of hot air to the inner tubular section of the mold or such section of the mold is made thin, or a metal having good heat conductivity as aluminum is used for that section. Heating temperature is ordinarily 160 to 400° C. and heating time is in a range of 15 to 120 minutes. The cooling of the molded articles in the present invention is ordinarily done rapidly, and usually the mold is dipped in a water tank or is rapidly cooled by shower. Since very fine crystals are obtained and escape of gas generated can be prevented by rapid cooling, strong molded articles can be obtained. While the mechanical strength of the foamed shaped articles of the present invention is generally very high as they have strong and thick surface layer, the resistance to compression in the center of the article tends to be lowered as the inner layer is well foamed. In order to further enhance the compression resistance of such foamed shaped articles, such voids or dents as having a round, ellipse, square or rectangular shape are intentionally provided on the molded articles. In this way strong and thick surface layer is also formed at said void or dented portion. Such rigid material as concrete block or wooden piece is inserted at such void or dented portions. When such reinforcing materials as metal plate, shaped steel, pipe, wire, metal screen, lath board, etc. is inserted to the surface layer of the molded articles, which is slightly foamed or not foamed, the strength of this molded articles is remarkably enhanced.

As a method for further enhancing the strength of the foamed shaped articles of the present invention, granules of non-foaming or slightly foaming plastics are added beside powdered plastics and foamable granular plastics, and are heated and foamed. By doing this, such structural element as is not foamed well is formed in the foamed core and linked to the strong surface layer which covers entire surface of the plastic molded article, thus the strength is further enhanced. In some cases this reinforcing plastic is integrally bound with foamable plastic material beforehand and is used as such. For example, these two sheets shaped materials are laminated together and then pulverized and used as such. Or, foamable granular plastics are formed into a thin rod shape which is then covered with non-foaming reinforcing layer. This material is cut and put in the mold for further process.

Thus the plastic molded articles of the present invention have light weight and excellent mechanical properties, therefore they are very useful as plastic foamed shaped articles of large size such as pallets and other desired articles; thus their industrial value is very high. Next, examples of the present application are explained.

EXAMPLE 1

100 parts by weight of low density polyethylene (Yukalon YF-30, made by Mitsubishi Petrochemical), 10 parts by weight of azodicarbon-amide and 0.8 parts by weight of dicumyl peroxide are uniformly kneaded by a roll mill and are formed into cubic pellet having a side of about 3 mm. 18 gr. of said kneaded pellets 72 gr. of high density polyethylene powder (Nissan 6020P, 100 to 200 meshes, made by Nissan Chemical Industry), and 0.7 gr. of azodicarbon amide were mixed together in a blended, then the mixture was placed in a steel mold of 220 x 50 x 25 mm. and was heated and foamed for 45 minutes by hot air of 300° C. while the mold was rotated at a speed of 4 revolutions per minute. The foamed material thus obtained had slightly foamed strong surface layer of a uniform thickness about 4-mm. and well foamed core at inside, beside excellent compression strength and flexural strength.

EXAMPLE 2

The granular plastics and powdered plastics and the mold similar to those used in Example 1 were used, and by varying the weight ratio of two kinds of plastics molded articles foamed about 3 times were produced, the thicknesses of surface layers being varied. The results of measurement of the thickness of the surface layers and bending elasticity were as shown in Table 1, from which it is known that the larger the thickness, the greater the bending elasticity and that bond between surface layer and foamed core is very strong.

TABLE 1

| Thickness of surface layer (mm.) | Bending elasticity (kg./cm.$^2$) |
|---|---|
| 0.5 | 1,100 |
| 1.0 | 1,630 |
| 1.5 | 2,400 |
| 2.0 | 3,260 |
| 2.5 | 4,130 |

EXAMPLE 3

100 parts by weight of low density polyethylene, 10 parts of azodicarbonamide, and 0.3 parts of dicumyl peroxide were knead uniformly by a roll mill and formed into cubic pellets with a side of about 5-mm. (A). 100 parts by weight of epoxy resin (Epicoat 828 made by Shell), 29 parts by weight of dipropylene glycol, 44 parts by weight of pyromellitic acid anhydride, and 20 parts by weight of polyethylene glycol with molecular weight of 3,000 were mixed for 3 hours at 60° C. and the resultant reactant is cooled and pulverized into such powder as having particle size of 100 mesh or smaller (B).

25 gr. of the pellets (A) and 75 gr. of the powder (B) were placed in a mold of 220 x 50 x 25 mm. and were heated and foamed for 60 minutes by hot air of 320° C. while being rotated at a speed of 20 revolutions per minute (r.p.m.). The foamed articles thus obtained had such uniform surface layer as about 3 mm. thick, further having harder surface layer and higher flexural strength than those of foamed articles made entirely of thermoplastic resin. They had sufficient resistance to deformation under a load at 100° C.

EXAMPLE 4

Low density polyethylene pellets (diameter about 3 mm.) containing cross-linking agent and foaming agent, high density polyethylene powder (MI.5) which passes through a 100 mesh screen, and asbestos (grade 7M in Canadian grade) being subjected to 3 hours drying at 400° C. were mixed with the ratio shown in Table 2, then fed into a rectangular parallelpiped mold, 25 mm. thick, 50 mm. wide, 215 mm. long, and were heated for 30 minutes by hot air of 290° C. while being rotated at a speed of 5 r.p.m., then thereafter cooled by water thus such foamed shaped articles being foamed about 3 times as having skin layer of uniform thickness were obtained. The molded articles thus obtained had foaming magnification of about 11 times at their inner core and large portion of the asbestos was contained in the skin layer with a thickness of about 2 mm. which was not foamed. For comparison, instead of the above mentioned low density polyethylene pellets, low density polyethylene powder passing through 100 mesh, cross-linking agent and foaming agent were used in powder foam with same ratio and foamed articles with uniformity throughout their structure were molded. The bending elasticity of the molded articles thus obtained was measured by 3 point load of span distance of 200 mm. The results are shown in Table 3 below.

TABLE 2 (EXAMPLE)

|  | Low density PE pellets,[1] gr. | High density PE powder, gr. | Asbestos, gr. | Bending elasticity, kg./cm.$^2$ |
|---|---|---|---|---|
| Number 1 | 18.4 | 66.2 | 7.4 | 3,100 |
| Number 2 | 18.4 | 58.9 | 14.7 | 4,000 |

[1] Containing crosslinking agent and foaming agent.

TABLE 3 (CONTROLS)

|  | Low density PE powder,[1] gr. | High density PE powder, gr. | Asbestos, gr. | Bending elasticity, kg./cm.$^2$ |
|---|---|---|---|---|
| Number 1 | 18.4 | 66.2 | 7.4 | 1,100 |
| Number 2 | 18.4 | 58.9 | 14.7 | 1,200 |

[1] Containing crosslinking agent and foaming agent.

It can be seen from the above results that when such powder form reinforcing material as asbestos is used, the reinforcing material will be gathered in skin layer thus the object of the present invention can be more effectively achieved.

EXAMPLE 5

Using same foaming pellets in Example 1, sheets of 2 mm. thickness were molded by an extruder, then 1 mm. thick sheet of high density polyethylene was heated and laminated with the above mentioned first sheet after heating the latter sheet. This composite sheet was cut into cube having a side of about 3-mm. long. The foamed shaped articles produced from the above together with the powdered plastic material which is almost same as the one shown in Example 1 under same production conditions, had very strong compressive strength because they contained layers of unfoamed high density polyethylene being stretched in a skeleton-like structure scattered at various spots of the foamed inner core.

EXAMPLE 6

20 grams of granules of copolymer of ethylene vinyl acetate having a side length of about 1 mm. were added to the material shown in Example 1 and the mixture was heated and foamed under the same production condition shown in Example 1. A molded article having three layer structure of polyethylene, ethylene-vinyl acetate copolymer, cross-linked polyethylene was obtained.

EXAMPLE 7

100 parts by weight of ethylene vinyl acetate copolymer, 5 parts by weight of azodicarbon-amide, and 1.2 parts by weight of dicumyl peroxide were sufficiently kneaded by a roll mill then pulverized to obtain powder under 50 mesh. 100 gr. of the pellets used in Example 1 were added to 100 gr. of said powder and the mixture was placed in a mold made of steel plates having uneven or dented spots on its inner surface, of 100 x 300 x 50 mm. size, and said mold was heated for 30 minutes by the steam of steam pressure 12 kg./cm.$^2$ while being rotated to have foaming take place. Molded articles obtained was foamed about 7 times and had on its surface uneven or dented spots being exactly reproduction of the inner surface of the mold, having great friction resistance of its surface.

EXAMPLE 8

5 grams each of rigid PVC, polystyrene, nylon each of which being cut to have a side of about 3 mm. was added to the material shown in Example 1, and was foamed under the exact same condition as shown in Example 1. The molded article thus obtained had smooth surface, and the rigid PVC, polystyrene and nylon were mixed in inner core of the same.

EXAMPLE 9

The material shown below was mixed together and was placed in a mold for pallet, heated for 70 minutes by hot air of 350° C. while being rotated at 0.5 r.p.m., then was rapidly cooled by shower, and a pallet with a shape shown in FIG. 1 with a density of 0.3 gr./cm.$^3$ was obtained:

High density PE (Ml 2, 100 to 200 mesh) ____kg__ 15.3
Low density PE (Ml 1, 30 to 50 mesh) ____kg__ 4.0
Azodicarbon-amide _____kg__ 0.2
Foamable pellets (diameter 6 mm.,
  length 6 mm.) _____kg__ 2.1
which consist of (parts by weight):
High density PE _____ 50
Low density PE _____ 50
Azodicarbon-amide _____ 10
Dicumyl peroxide _____ 0.8

Figure 2:
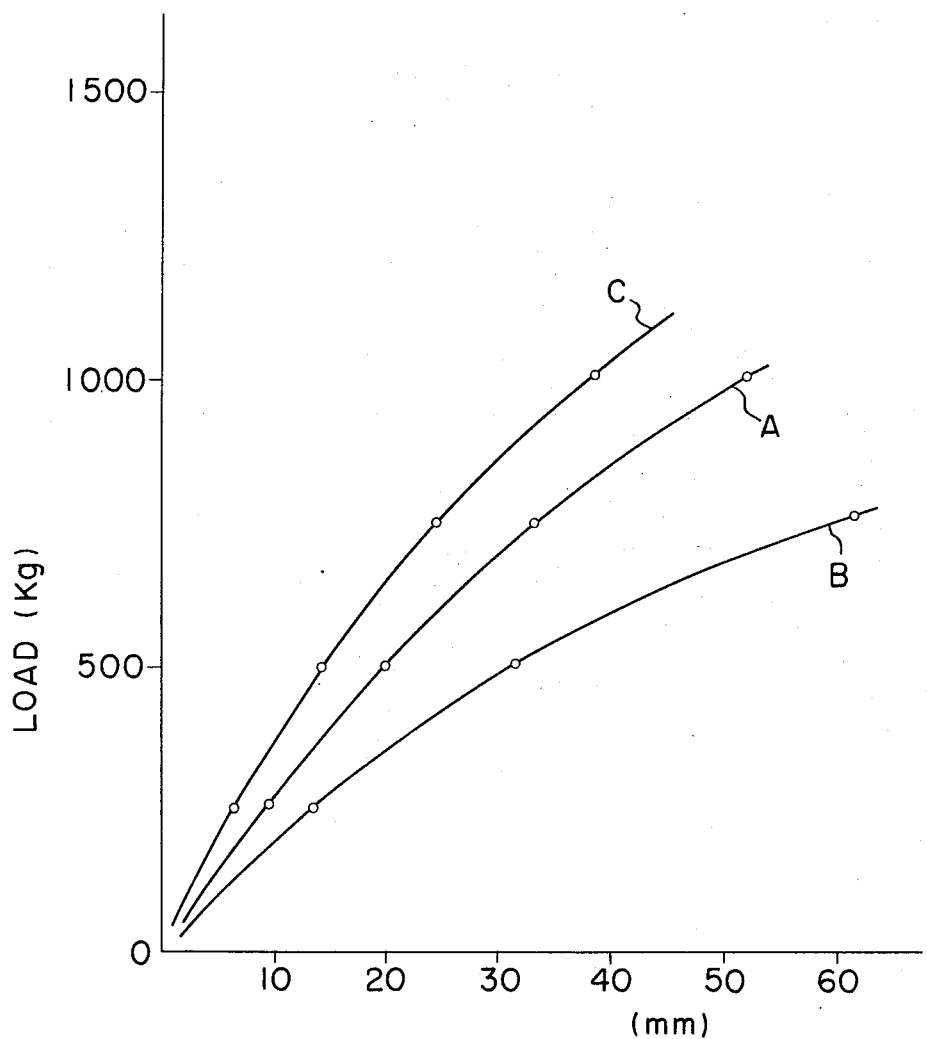
FIG. 2 illustrates the compressive strength of the pallets produced.

This pallet had strong surface layer and the amount of deflection as measured by JIS–Z–0602 was as shown in FIG. 2, curve A, thus being very strong. This pallet passed the drop test, compressive strength test by JIS–Z–0602 (Japanese Industrial Standard).

On the other hand, a pallet obtained by same method as shown above with the material obtained by mixing the high density polyethylene powder, low density polyethylene powder and azodicarbon-amide with an extruder for form the same to a shape of 6 mm. diameter and 6 mm. length then mixing the same with cross-linkable pellets of the same shape, did not have skin sufficiently formed, with its strength being lower as shown by the curve B in FIG. 2.

EXAMPLE 10

Molding metal insert made of steel plate having the shape as shown in FIG. 3 were inserted at both ends of the pallet shown in FIG. 1 and a pallet was produced under the same condition as shown in Example 9. End of this metal insert was so controlled that it comes to the position being at 3 mm. from the surface layer of said pallet. And major portion of the metal insert was positioned at surface layer portion. The pallet thus obtained had such portion as receiving claws of a forklift being reinforced by the metal insert, thus it was very strong against impact and had low deflection as shown by the curve C in FIG. 2.

EXAMPLE 11

100 parts by weight of polypropylene with Melt Index of 1.3 (commercial name Mitsubishi Noblen), 5 parts by weight of azodicarbonamide, and 5 parts by weight of polybutadiene (commercial name Nippol BR 1220 made by Nippon Zeon) were uniformly kneaded by a roll mill to form pellets having a side of 3 mm.: 70% by weight of polypropylene powder slightly contained foaming agent was mixed into 30% by weight of the above mentioned pellets and 90 gr. of said mixture was placed in a mold made of steel plate, 22 x 5 x 2.5 cm. and was heated and foamed for 45 minutes by hot air of 300° C. while being rotated at the speed of 10 r.p.m. The foamed article thus obtained had strong surface layer of uniform thickness of about 2 mm., as shown in FIG. 4, and it was very strong.

EXAMPLE 12

72 gr. of PVC powder (100 mesh or smaller) and 1 gr. of azodicarbonamide were added to 8 gr. of the cross-linkable foamable pellets shown in Example 9 and the mixture was placed in a mold made of aluminum having inside volume of 240 ml., and was heated for 15 minutes, while being rotated at a speed of 8 r.p.m. under the steam of 10 kg./cm.$^2$. The molded article obtained by water cooling the above had almost a uniform surface layer of PVC as shown in FIG. 5 and had flame retardant characteristic, wherein bonding between cross-linked PE and PVC was not bad.

A molded article obtained by using 52 gr. of PVC powder, and 20 gr. of ethylene·vinyl acetate copolymer having a side of about 1 mm. instead of the 72 gr. of PVC mentioned above and foaming the same in a same manner had the ethylene·vinyl acetate copolymer situated at the center of PVC and the bonding between polyethyene and PVC was very good.

EXAMPLE 13

2 kg. of the cross-linkable pellets shown in Example 9 and 18 kg. of ABS powder (under 100 mesh) were placed in a mold made of steel plate for making the article having dented spots as shown in FIG. 6, having a size of 1000 x 1000 x 150 mm., and was heated and foamed for 60 minutes at 330° C. while being rotated at a speed of 1 r.p.m. Then the same was rapidly cooled to obtained foamed composite molded article. This molded article had uniform surface layer by ABS resin and had excellent bending elasticity. Further as it had such surface layer as being laid up in the direction of its thickness around the dented spots, the deflection and compression strength of the same were also very good.

EXAMPLE 14

50 parts by weight of high pressure PE, 50 parts by weight of medium pressure PE, 1 part by weight of dicumyl peroxide, and 5 parts by weight of azodicarbonamide were kneaded by a roll mill and were formed into granules having one side of about 5 mm.

40 grams of medium pressure PE powder were added to 40 grams of said granules and the mixture was placed in a mold of 200 x 50 x 25 mm. and was heated and foamed for 60 minutes at 250° C. within a thermostat having a shaking apparatus while being shaked with a stroke of 50 mm. to a horizontal direction at a speed of 60 strokes a minute. The foamed article thus obtained had a density of 0.35 gr./cm.$^3$, wherein well foamed layer and rigid and strong plastic layer were very rigidly bonded together.

What is claimed is:

1. A method for producing a foamed composite article which comprises placing a mixture consisting essentially of (1) a powdered thermoplastic resin selected from the group consisting of polypropylene, polyethylene, nylon, acrylonitrile-butadiene-styrene terpolymer, rigid polyvinyl chloride and a polycarbonate and (2) partially cross-linked or a cross-linkable granular thermoplastic resin selected from the group consisting of low density polyethylene and blends of low density polyethylene and high density polyethylene containing a foaming agent in a mold so as to occupy up to 90% of the volume of the mold, the size of the granular plastic being 10 mesh or larger and at least 3 times the diameter of the powdered plastic, rotating the mold at a speed of 0.1–15 meters per minute, measured at the fastest moving portion of the mold, to separate the two kinds of plastics from each other, and heating the mixture to cause said powdered thermoplastic resin to fuse on the surface of the mold and to cause said granular thermoplastic resin to foam and coalesce into a foamed core portion of the foamed composite article.

2. A method in accordance with claim 1, wherein the powdered plastic is 30 mesh or smaller.

3. A method in accordance with claim 1, wherein a powdered material having a greater density and higher thermal conductivity than the powdered themoplastic resin is added to the powdered thermoplastic resin.

4. A method in accordance with claim 1, wherein a foaming agent, flame retardant agent or antioxidant, ultraviolet ray absorbing agent, reinforcing agent is added to the powdered thermoplastic resin.

5. A method in accordance with claim 1, wherein the granular plastic is 5 mesh or larger.

6. A method in accordance with claim 1, wherein the speed of the fastest moving portion of the mold is 5 m./minute to 0.1 m./minute.

7. A method in accordance with claim 1, wherein the heating is accomplished by steam or hot air.

8. A method in accordance with claim 1, further comprising cooling the mold by placing it into water or by a shower.

9. A method in accordance with claim 1, wherein a metal plate, shaped steel, wire, pipe, metal screen or lath board is provided beforehand in the portion of the mold where the non-foamed or slightly foamed surface layer will form.

10. A method in accordance with claim 1, wherein the powdered plastic has a higher melting point than the granular plastic.

11. A method in accordance with claim 1, wherein the diameter of the granular plastics is 10 times the diameter of the powdered plastics.

12. A method in accordance with claim 1, wherein three layers are formed in the composite foamed article by incorporating in the mixture coarse thermoplastic resin particles having a particle size between the size of the powdered plastic and the size of the granular plastic and by including a small amount of foaming agent in the powdered thermoplastic resin.

13. A method in accordance with claim 1, wherein the configuration of the mold surface is constructed so as to provide voids or dents or round, elipse, square or rectangular shape on the molded article.

References Cited
UNITED STATES PATENTS

| | | | |
|---|---|---|---|
| 3,309,439 | 3/1967 | Nonweiler | 264—45 |
| 3,457,205 | 7/1969 | Nonweiler | 264—53 X |
| Re. 26,850 | 4/1970 | Palmer | 264—54 X |
| 3,455,483 | 7/1969 | Inklaar | 264—54 X |
| 3,359,130 | 12/1967 | Goldman | 264—53 X |

PHILIP E. ANDERSON, Primary Examiner

U.S. Cl. X.R.

108—51; 161—160, 161; 264—54, 126, 271, 310, Dig. 5, Dig. 18; 312—214